(12) United States Patent
Kwon et al.

(10) Patent No.: US 8,664,805 B2
(45) Date of Patent: Mar. 4, 2014

(54) POWER DISTRIBUTION APPARATUS

(75) Inventors: Yeong Min Kwon, Gyeonggi-do (KR);
Byung Suk Kwon, Gyeonggi-do (KR);
Byung Jin Kwon, Gyeonggi-do (KR);
Sung Tae Park, Gyeonggi-do (KR)

(73) Assignee: LC Power Korea Co. Ltd., Seoul (KR)

( * ) Notice: Subject to any disclaimer, the term of this patent is extended or adjusted under 35 U.S.C. 154(b) by 1004 days.

(21) Appl. No.: 12/681,503

(22) PCT Filed: Oct. 2, 2008

(86) PCT No.: PCT/KR2008/005800
§ 371 (c)(1),
(2), (4) Date: Apr. 2, 2010

(87) PCT Pub. No.: WO2009/045055
PCT Pub. Date: Apr. 9, 2009

(65) Prior Publication Data
US 2010/0226113 A1    Sep. 9, 2010

(30) Foreign Application Priority Data

Oct. 4, 2007 (KR) .......................... 10-2007-0099596
Jun. 24, 2008 (KR) .......................... 10-2008-0059754
Jun. 24, 2008 (KR) .......................... 10-2008-0059756

(51) Int. Cl.
*H02B 1/20* (2006.01)
(52) U.S. Cl.
USPC .......................................................... 307/147
(58) Field of Classification Search
USPC .......................................................... 307/147
See application file for complete search history.

(56) References Cited

U.S. PATENT DOCUMENTS 7,338,331 B2 * 3/2008 Yoon .............................. 439/709
2009/0185335 A1 7/2009 Kwon ............................ 361/643

FOREIGN PATENT DOCUMENTS

| KR | 10-2006-0009663 | 2/2006 | ............... H01R 9/11 |
| KR | 10-0594903 | 6/2006 | ............... H02B 1/20 |
| KR | 10-2006-0080845 | 7/2006 | ............... H04H 71/08 |
| KR | 20-0427176 | 9/2006 | ............... H02B 1/20 |

* cited by examiner

*Primary Examiner* — Hal Kaplan
(74) *Attorney, Agent, or Firm* — Harness, Dickey & Pierce, P.L.C.

(57) ABSTRACT

A power distribution apparatus is provided. The apparatus may include a modulated block type power distribution apparatus capable of reducing a space by consequently connecting a main breaker to a sub breaker as a block not to form a gap while installing. The apparatus may include a multifunctional block type power distribution apparatus capable of easily connecting breakers with one another, the breaker having different height, by additionally installing a height controller able to control a height of a branch breaker on the apparatus manufactured in one mold and preventing wrong coupling while connecting a plurality of branch breakers with one another. The apparatus may include a preassembled power distribution apparatus capable of increasing coherence between terminals while coupling a main breaker terminal, a branch breaker terminal, and an additional breaker terminal, forming the preassembled power distribution apparatus, with various terminals of another preassembled power distribution apparatus.

10 Claims, 17 Drawing Sheets

POWER DISTRIBUTION APPARATUS

CROSS REFERENCE TO RELATED APPLICATION

This application is a 371 of PCT International Application No. PCT/KR2008/005800 filed Oct. 2, 2008 (Publication No. WO 2009/045055), which claims priority to Korean Patent Application No. KR 10-2008-0059756, filed Jun. 24, 2008, Korean Patent Application No. KR 10-2008-0059754, filed Jun. 24, 2008, and Korean Patent Application No. 10-2007-0099596, filed Oct. 4, 2007. The disclosures of the above applications are incorporated herein by reference in their entirety.

TECHNICAL FIELD

The present invention relates to a power distribution apparatus, and more particularly, to a modulated block type power distribution apparatus capable of easily manufacturing a cabinet panel and preventing a gap to be assembled fine while consequently connecting an additional sub breaker to a breaker as a block, to a multifunctional power distribution apparatus capable of easily connecting to another breaker by additionally installing a height controller controlling a height of a branch terminal in the apparatus manufactured in a single mold and installing a safety pin to prevent wrong coupling while connecting a plurality of branch breakers to one another, and installing a transparent cover to shield a connection terminal, and to a preassembled power distribution apparatus capable of increasing electric conductivity, reducing resistances, and reducing unfastening or heat generation to be safely used by providing a construction capable of increasing coherence between terminals while coupling a main breaker terminal, a branch breaker terminal, and an additional breaker terminal, forming the preassembled power distribution apparatus, with terminals of another preassembled power distribution apparatus.

BACKGROUND ART

In general, various breakers such as a main breaker, a branch breaker, and a short-circuit breaker break off the power of industrial and home electric cabinet panels and switch boards. However, it is very difficult to manufacture cabinet panels and switch boards. Also, to manufacture cabinet panels and switch boards, there is required specific equipment such as a bus bar processor.

Generally, to break off the power of cabinet panels and switch boards, a bus is connected to by using a bus bar and attached to a breaker. Also, the bus bar passes through complicated manufacturing processes such as holing, tabbing, beveling, coating, tube bending, and tube cutting. Therefore, manufacturing costs are increased and a delay in delivery is generated since it is possible to manufacture cabinet panels and switch boards only by a bus bar processor.

In general bus bars, a power source in the line of R supplies power to R1-RL-NR, a power source in the line of S supplies power to S1-SL-SR, a power source in the line of T supplies power to T1, TL, and TR, and a power source in the line of N supplies power to N1-NL-NL-RR, which allows foreign substances to be inserted into a gap generated while attaching a breaker. Therefore, there is always a danger of accidents. Also, since a location of a breaker connected to right and left of a branch breaker is out of line in a conventional bus bar connection way, which makes it impossible to fix an each phase, it is impossible to allow right and left branch breakers to correspond to each other by embodying a highly wrought connection bus bar. Also, since there is required a lot of time to manufacture a cabinet panel, it is difficult to quickly restore an emergent electric accident.

Also, when disassembling a cabinet panel or a switch board, it is difficult to recycle components since components are not standardized. Though iron covers have been used to protect an exposed charger, acryl covers are used because of easiness of manufacture. However, in this case, a toxic gas is generated from acryl on fire. Also, the charger is exposed when checking or changing a breaker, thereby generating electric shocks and short-circuits due to foreign substances.

In the case of block type power distribution apparatuses, different from general copper bus bar cabinet panel, an apparatus is divided into blocks and in such a way that power can be supplied from a main breaker to a desired branch breaker, thereby having high utility, productivity, stability, and compatibility with general breakers.

However, general block type power distribution apparatuses have problems as below.

(1) To be compatible with various breakers, it is easy to connect to each other when a height of a branch breaker terminal is identical to that of a connected branch breaker. However, there occurs a case where a certain breaker cannot be used because a height of a block type power distribution apparatus is different from that of a branch breaker. To solve this problem, it is required to manufacture an additional block type power distribution apparatus for other breakers having a different height. However, there is required another additional mold, thereby increasing manufacturing costs and reducing productivity and economical efficiency.

(2) When several identical terminals are projected while branching out a plurality of breakers from one power distribution apparatus, a breaker may be connected to a wrong terminal, thereby generating a danger such as a short-circuit, heat, and a fire.

(3) Static electricity or a short-circuit may occur since a human body directly contacts with a connection portion or foreign substances are inserted into the connection portion while a connection terminal is exposed from a bottom of a power distribution apparatus to connect to another power distribution apparatus. Also, when using identical block type power distribution apparatuses, it is impossible to show to where each of power distribution apparatuses distributes power. Accordingly, it is impossible to attach a name tag to the power distribution apparatus.

Also, a cabinet panel is an apparatus supplying external power to each branch breaker via a main breaker. Generally, copper bus bar cabinet panels are used. Plug-in type preassembled cabinet panels have been developed. In the case of a preassembled power distribution apparatus, different from conventional copper bus bar cabinet panels, blocks forming the power distribution apparatus are connected to one another to supply power from a main breaker to a desired branch breaker, which has high utility, productivity, and stability. However, the apparatus includes a main breaker terminal and a branch breaker terminal, mostly formed of a metal bar having high electric conductivity, such as copper, whose electric conductivity and stability are affected by a connection method.

Generally, to connect a preassembled power distribution apparatus, a screw thread is formed on a connection terminal and a main breaker terminal is connected by bolts and nuts, which is called as a screw coupling method. As a thickness of the screw thread, a screw contacts with the connection terminal.

However, such preassembled power distribution apparatuses have problems as below.

(1) A thickness of a screw thread is increased to increase a contact area, thereby reducing resistance, heat, and unfastening, which is considered as advantageous. However, actually, it causes increase of manufacturing costs to consume much material to increase a thickness of a terminal.

(2) A material of bus bars used in mostly cabinet panels at present is copper. Also, in preassembled power distribution apparatuses, there is a power distribution circuit formed of copper. Due to increase of the cost of copper as raw material, manufacturing costs of power distribution apparatuses are increased. Accordingly, instead of copper, which is very expensive, aluminum or economic light copper (ELC), which have electric characteristics similar to those of copper and are cheaper than the copper, are used substituted for the copper to reduce manufacturing costs.

However, it is avoided to use a material substituted for the copper due to a deformation or unfastening of screw coupling caused by heat when using the material substituted for the copper, the material which has workability or mechanical characteristics inferior to those of the copper.

(3) In the case of preassembled power distribution apparatuses, since a main breaker terminal and a branch breaker terminal are installed therein and power is supplied via the terminals, there occurs a lot of heat in a case. However, since conventional preassembled power distribution apparatuses are perfect closed, which make it difficult to discharge heat.

(4) In addition, since a main breaker terminal and a an additional breaker terminal of a preassembled power distribution apparatus have the same height, when connecting a plurality of preassembled power distribution apparatuses, a height thereof becomes gradually increased according to a thickness of a terminal.

That is, since a main breaker terminal is coupled with a top of an additional breaker terminal, a second preassembled power distribution apparatus coupled with a first preassembled power distribution apparatus is assembled as being higher by a height of an additional breaker terminal of the first preassembled power distribution apparatus. In addition, a third preassembled power distribution apparatus is assembled as being higher by an additional breaker terminal of the second preassembled power distribution apparatus. Accordingly, when coupling a plurality of preassembled power distribution apparatuses in a line, a height thereof is consecutively increased in such a way that a preassembled power distribution apparatus in a latter part gets loose from a body when fastening the preassembled power distribution apparatus to the body.

DETAILED DESCRIPTION OF THE INVENTION

Technical Problem

The present invention provides a modulated block type power distribution apparatus capable of having a natural connection part and basically preventing foreign substances by forming blocks to removing a gap while assembling a main breaker with a sub breaker, and preventing a change of angle, which may occur in a contact portion while working, by coupling a connection part of the main breaker terminal with the sub breaker terminal by riveting on both points.

The present invention also provides a multifunctional block type power distribution apparatus capable of being compatible with another terminal having a different height by one mold, preventing dangerous accidents caused by connecting a breaker to a wrong terminal, which may occur while connecting a plurality of branch breaker terminals to one power distribution apparatus, reducing a danger that may occur due to an exposed connection terminal of the power distribution apparatus, and increasing convenience of connection.

The present invention also provides a preassembled power distribution apparatus capable of increasing coupling strength between a connection terminal and a main breaker terminal by raising a screw connection part by burying a screw thread of an additional breaker terminal while connecting the connection terminal to the main breaker terminal, of reducing a deformation caused by heat and screw unfastening, which may occur when screw-connecting a bus bar of a cabinet panel and a power distribution circuit, a main breaker terminal, a branch breaker terminal, and a connection terminal of the preassembled power distribution apparatus formed of a material substituted for copper, and of maintaining a level of a height while coupling terminals with each other, by inserting a nut in a case part where an additional breaker terminal is located, to have a double coupling structure using nuts, forming a ventilating opening for discharging heat in the case and molding terminals in the shape of a step.

Technical Solution

According to an aspect of the present invention, there is provided a modulated block type power distribution apparatus including: a main breaker terminal electrically connected to a main breaker; a sub breaker terminal arranged right and left of the main breaking terminal and electrically connected to a sub breaker; and an additional breaker terminal arranged below the main breaker terminal and connected to an additional breaker, the apparatus having a connecting configuration wherein the main breaker terminal is arranged in an order of R, S, T, and N from left to right, the additional breaker terminal is arranged in an order of R1, S1, T1, and N1 from left to right, the left sub breaker terminal is arranged in an order of RL, SL, TL, and NL from top to bottom, the right sub breaker terminal is arranged in an order of NR, SR, TR, and NR from top to bottom, the main breaker terminal in the line of R is connected to the additional breaker terminal R1, the left sub breaker terminal RL, and the right sub breaker terminal RR; the main breaker terminal in the line of S is connected to the additional breaker terminal S1, the left sub breaker terminal SL, and the right sub breaker terminal SR; the main breaker terminal in the line of T is connected to the additional breaker terminal T1, the left sub breaker terminal TL, and the right sub breaker terminal TR; and the main breaker terminal in the line of N is connected to the additional breaker terminal N1, the left sub breaker terminal NL, and the right breaker terminal NR.

Power may be supplied via a modulated block without a bus connecting the main breaker and the sub breaker.

The apparatus may have a configuration capable of independently forming the main breaker terminal and a sub breaker terminal on both sides of the apparatus.

The main breaker terminals R, S, T, and N may be connected to the left sub breaker terminal by using a plurality of rivets, and the main breaker terminals R, S, T, and N may be connected to the right sub breaker terminal by using a plurality of rivets.

The left sub breaker terminal NL and the right sub breaker terminal RR may be disposed in a straight line.

A top case and a bottom case, covering the apparatus, may be fastened using a protruded pin for preventing shaking, when coupling the top case and bottom case with each other. The additional breaker terminal may be formed to be disposed inside without protruding outwardly from the top case and the bottom case and may be arranged in a straight line between the left sub breaker terminal NL and the right sub breaker terminal RR.

According to another aspect of the present invention, there is provided a block type power distribution apparatus including: a case protecting a power distribution line connecting to a main breaker terminal, a branch breaker terminal, and an additional breaker terminal; a plurality of the main breaker terminals located on a top surface of the case and connected to a main breaker power by a line; a plurality of the branch breaker terminals located on both sides of the case and connected to a branch breaker power by a line; and a plurality of the additional breaker terminals located on a bottom surface and sinking in a surface of the case to be connected to an external load side or to be connected to an additional distribution line, wherein the case includes a guide groove formed on the side thereof to control a height according to a height of another branch breaker, and height controlling supporters inserted in the guide groove and forming a coupling groove for the branch breaker terminal, the coupling groove corresponding to a height of a terminal.

The height controlling supporters may have a shape of one of ㄲ, ㅗ, ㄒ, and ㅗ. A multifunctional block type power distribution apparatus may include: a case protecting a power distribution line connecting to a main breaker terminal, a branch breaker terminal, and an additional breaker terminal; a plurality of the main breaker terminals located on a top surface of the case and connected to a main breaker power by a line; a plurality of the branch breaker terminals located on both sides of the case and connected to a branch breaker power by a line; a plurality of the additional breaker terminals located on a bottom surface and sinking in a surface of the case to be connected to an external load side or to be connected to an additional distribution line; and a safety pin located on the side of the case to divide connection of a branch breaker.

A multifunctional block type power distribution apparatus may include: a case protecting a power distribution line connecting to a main breaker terminal, a branch breaker terminal, and an additional breaker terminal; a plurality of the main breaker terminals located on a top surface of the case and connected to a main breaker power by a line; a plurality of the branch breaker terminals located on both sides of the case and connected to a branch breaker power by a line; and a plurality of the additional breaker terminals located on a bottom surface and sinking in a surface of the case to be connected to an external load side or to be connected to an additional distribution line, wherein the case includes a guide groove formed on the side thereof to control a height according to a height of another branch breaker, and height controlling supporters inserted in the guide groove and forming a coupling groove for the branch breaker terminal, the coupling groove corresponding to a height of a terminal, the height controlling supporters formed of installing a safety pin for dividing connection of the branch breaker.

A multifunctional block type power distribution apparatus may include: a case protecting a power distribution line connecting to a main breaker terminal, a branch breaker terminal, and an additional breaker terminal; a plurality of the main breaker terminals located on a top surface of the case and connected to a main breaker power by a line; a plurality of the branch breaker terminals located on both sides of the case and connected to a branch breaker power by a line; a plurality of the additional breaker terminals located on a bottom surface and sinking in a surface of the case to be connected to an external load side or to be connected to an additional distribution line; and a transparent cover detachably coupled with a top of the additional breaker terminal to shield the additional breaker terminal exposed from a bottom of the apparatus. The transparent cover may include a name tag fastener.

Advantageous Effects

A modulated block type power distribution apparatus according to an embodiment of the present invention has advantageous effects as below.

First, the power of the line of R is supplied to R1-RL-RR, the power of the line S is supplied to S1-SL-SR, and the power of the line of N is supplied to N1-NL-NL-NR to remove a gap formed while assembling a main breaker and a sub breaker, thereby providing a natural connection part and basically preventing foreign substances.

Second, a connection part between a main breaker and a sub breaker is coupled using a rivet on points of both sides, thereby preventing a change of angle, which can occur a contact part while working.

Third, it is possible to connect a deviated part formed because a location of a breaker connected to right and left of a connection part of a sub breaker in a conventional breaker connection method, to be identical while installing sub breakers of right and left in the power distribution apparatus.

Fourth, it is easy to manufacture a cabinet panel, by reassembling a breaker by unfastening a connection bolt attached to the breaker.

Fifth, a portion connecting NL to RR is separated and detoured, thereby smoothly assembling while consecutively installing an additional sub breaker as blocks.

A multifunctional block type power distribution apparatus according to another embodiment of the present invention has advantageous effects as below.

(1) In the case of power distribution apparatus having the same capacity, breakers having a different height may be connected to one another by using one mold without an additional mold, thereby increasing compatibility with a breaker and reducing manufacturing costs.

(2) An accident caused by connecting a breaker to a wrong terminal, which may occur while connecting a plurality of branch breakers in one power distribution apparatus, may be basically prevented, thereby increasing safety.

(3) A connection terminal on a bottom of a power distribution apparatus to connect the power distribution apparatus to another power distribution apparatus is shield by a transparent cover, thereby preventing static electricity and a short-circuit.

A preassembled power distribution apparatus according to another embodiment of the present invention has advantageous effects as below.

(1) When terminals are connect to each other by a screw, without additional increase of manufacturing costs to increase a thickness of a terminal, a screw thread of a connection terminal is formed by a burying structure, thereby increasing electric conductivity and reducing resistances, heat, and unfastening.

(2) An additional coupling nut is inserted and molded in a case to provide a double coupling structure, thereby reducing a deformation caused by heat or unfastening of a screw, which may occur while connecting a screw formed of a material substituted for copper, whose mechanical characteristics are low.

(3) A ventilating opening is formed on a case in such a way that a danger of a fire, caused by overheating is prevented and a smooth flow of electric working is provided.

(4) Since terminals are formed in the shape of a step, one preassembled power distribution apparatus is coupled with another preassembled power distribution apparatus at the same height, thereby stably fastening to a body.

BEST MODE FOR CARRYING OUT THE INVENTION

Exemplary embodiments of the present invention are described with reference to the accompanying drawings in detail. Detailed descriptions of well-known functions and structures incorporated herein may be omitted to avoid obscuring the subject matter of the present invention. Terms described below are defined considering functions in the present invention, which may be different according to an intention of users, appliers, and conventions. Therefore, terms will be defined based on contents throughout the entire of the description on a modulated block type power distribution apparatus according to an embodiment of the present invention.

Figure 1:
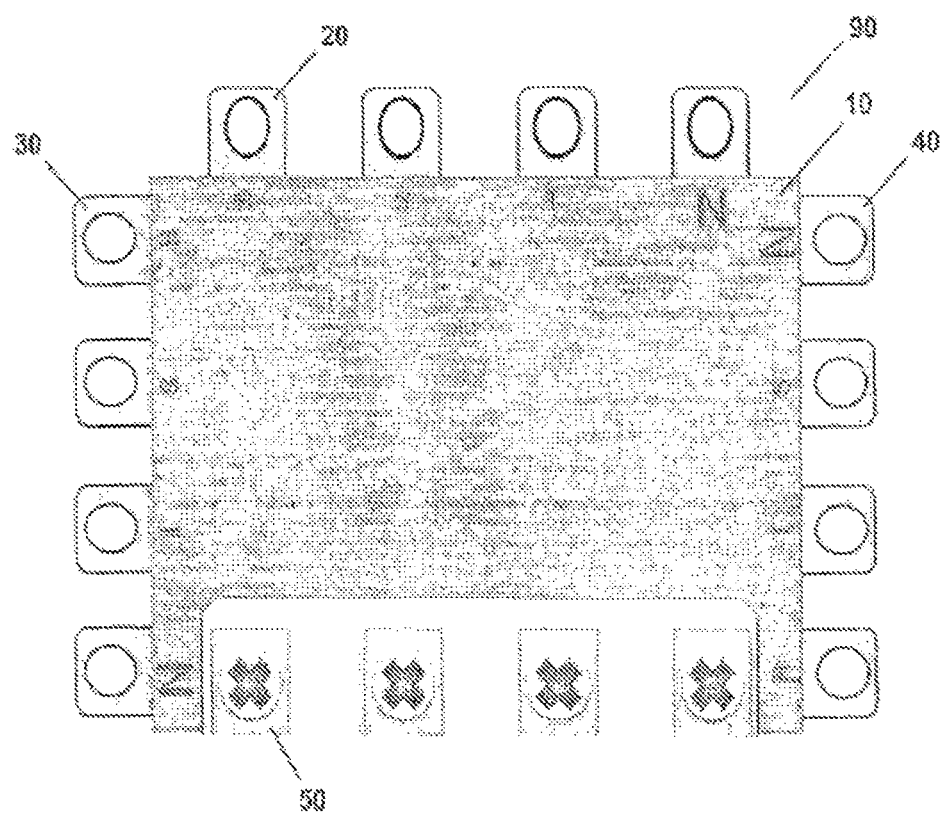
FIG. 1 is a top view illustrating a modulated block type power distribution apparatus according to an embodiment of the present invention.
Figure 2:
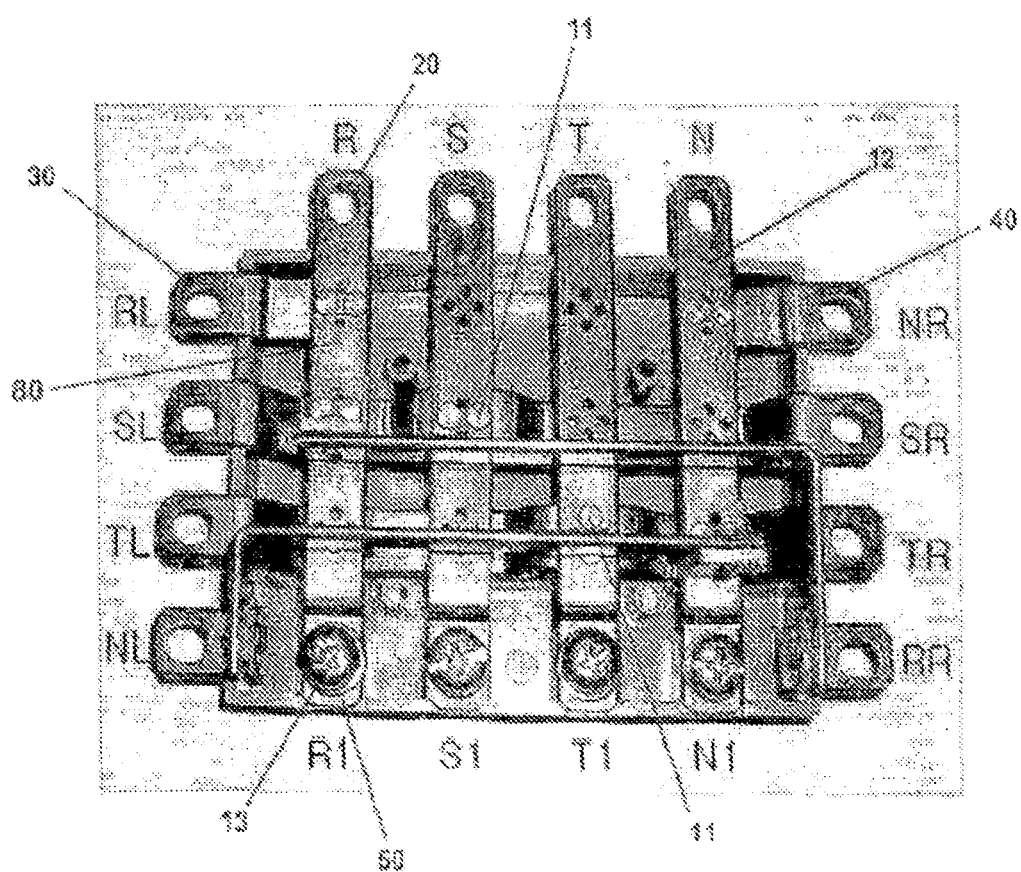
FIG. 2 is a view illustrating an inner connection structure of the modulated block type power distribution apparatus of FIG. 1.
Figure 3:
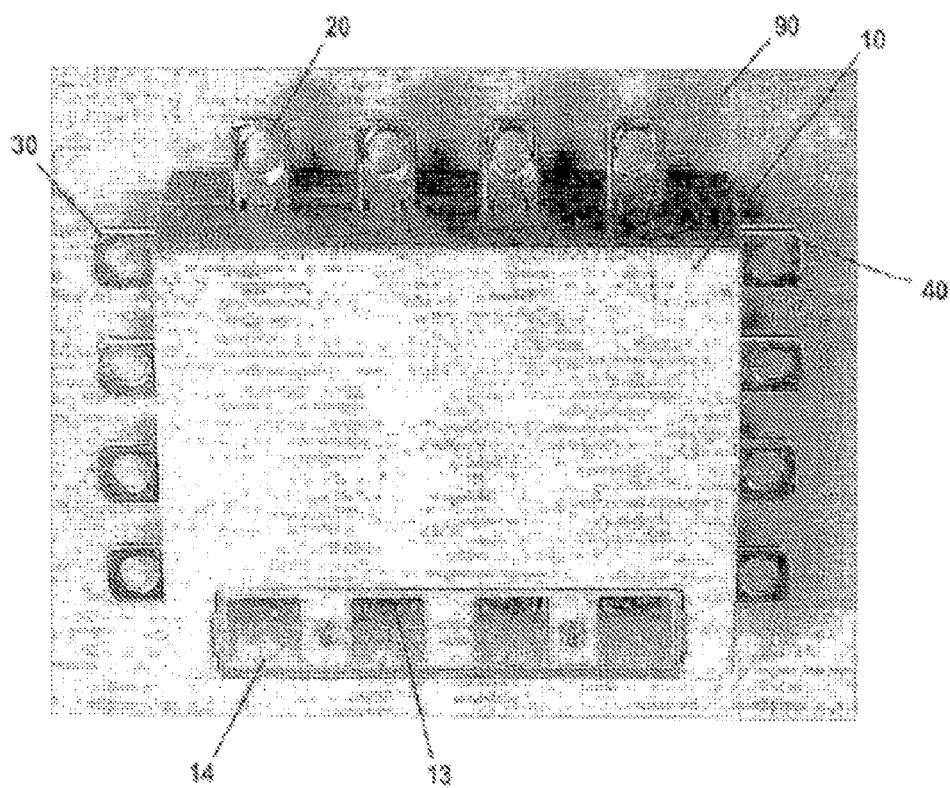
FIG. 3 is a view illustrating the modulated block type power distribution apparatus with an additional breaker terminal coupled by a bolt.
Figure 4:
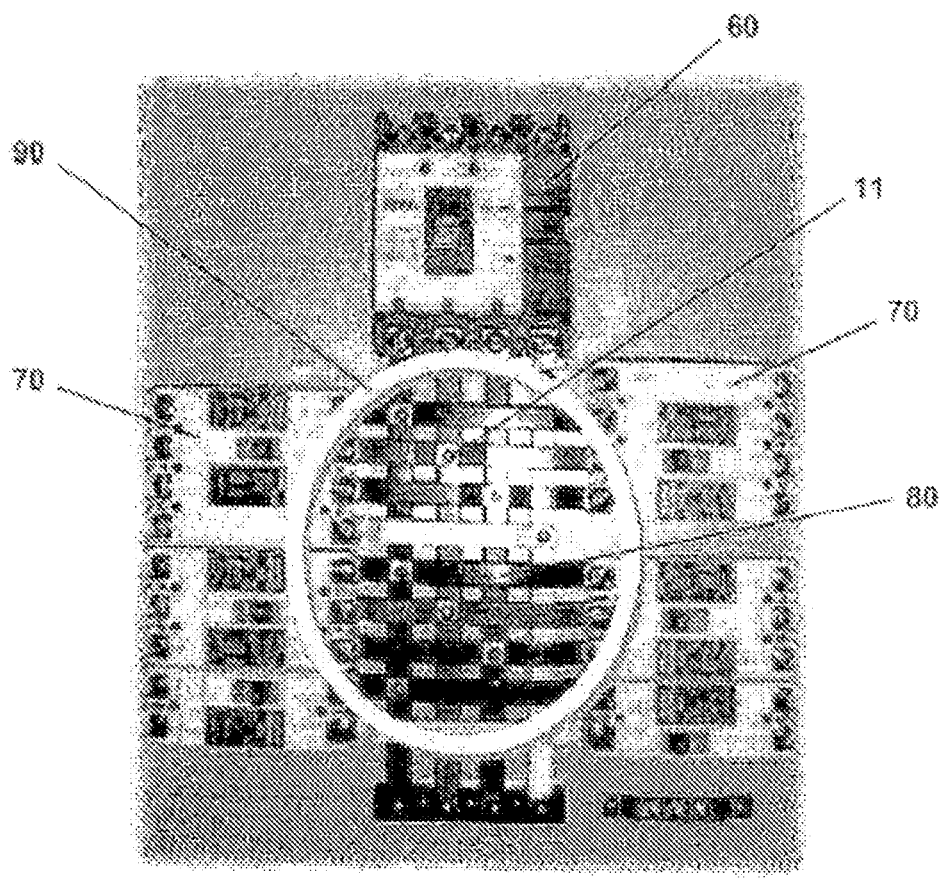
FIG. 4 is a view illustrating a main breaker connected to a sub breaker in a generally known method.

FIG. 1 is a top view illustrating a modulated block type power distribution apparatus according to an embodiment of the present invention. FIG. 2 is a view illustrating an inner connection structure of the modulated block type power distribution apparatus of FIG. 1. FIG. 3 is a view illustrating the modulated block type power distribution apparatus with an additional breaker terminal coupled by a bolt. FIG. 4 is a view illustrating a main breaker connected to a sub breaker in a generally known method.

As shown in FIGS. 1 to 3, a modulated block type power distribution apparatus 90 according to an embodiment of the present invention includes a case 10, a main breaker terminal 20, sub breaker terminals 30 and 40, an additional breaker terminal 50, a main breaker 60, a sub breaker 70, a line 80, a rivet 11, a protruded pin 12, a bolt 13, and an additional breaker terminal cover 14.

In FIGS. 1 to 3, though there are four of the main breaker terminals 20, the sub breaker terminals 30 and 40, and the additional breaker terminals 50, respectively, such as N, S, T, and R, this is just an example. The number of the main breaker terminals 20, the sub breaker terminals 30 and 40, and the additional breaker terminals 50 may be two, three, or four or more terminals.

Also, in FIGS. 1 to 3, there are shown terminals in an order of N, S, T, and R. However, locations of a terminal S and a terminal T may be changed into each other and an inner connection structure may be changed corresponding thereto.

The modulated block type power distribution apparatus 90 has a connection structure the main breaker terminal 20, the sub breaker terminals 30 and 40, and the additional breaker terminal 50 are installed in the case 10 protecting the line 80 for distributing power and connected to the main breaker terminal 20, the sub breaker terminals 30 and 40, and the additional breaker terminal 50. The main breaker terminal 20 is located on a top surface of the case 10, and the sub breaker terminals 30 and 40 are located on both sides of the case 10. The line 80 connects and supplies the power of a line R of the main breaker terminal 20 to R1 of the additional breaker terminal 50 and RL and RR of the sub breaker terminals 30 and 40. The line 80 connects and supplies the power of a line S of the main breaker terminal 20 to S1 of the additional breaker terminal 50 and SL and SR of the sub breaker terminals 30 and 40. The line 80 connects and supplies the power of a line T of the main breaker terminal 20 to T1 of the additional breaker terminal 50 and TL and TR of the sub breaker terminals 30 and 40. The line 80 connects and supplies the power of a line N of the main breaker terminal 20 to N1 of the additional breaker terminal 50 and NL and NR of the sub breaker terminals 30 and 40.

Generally, due to a terminal on NR right of a straight line from a terminal on NL of a left sub breaker, there occurs a phenomenon where a left breaker and a right breaker cross each other. However, according to an embodiment of the present invention, NL of the left sub breaker terminal is connected to RR of the right sub breaker terminal on a straight line, thereby improving an alternated structure of the sub breaker 70 to assemble and integrate a power distribution apparatus in a block. Also, a plurality of input areas attached to the main breaker 60 and a plurality input areas attached to the sub breaker 70 may be coupled therewith by bolts 13 only using projected portions without a washer or other materials.

The power may be distributed via a modulated block, without a bus connecting the main breaker 60 to the sub breaker 70. It is possible to independently constructing only the main breaker 60 and the sub breakers 70 on both sides.

Also, in an inner structure of the modulated block type power distribution apparatus 90, vertical bus bars and horizontal bus bars are coupled with one another by using a plurality of rivets 11, thereby preventing unfastening caused by oscillation and removing a bad connection caused by trembling, which may occur in a secondary working process after riveting. Instead of conventional bolt fastening methods in which an unfastening phenomenon occurs due to time elapse or oscillation, a riveting method strong in oscillations, shocks, and heat is applied, which is safer, and conductivity is increased by tinning or silver-plating.

Also, when coupling a top of the case 10 with a bottom of the case 10, the protruded pin 12 for preventing trembling is used to fasten them. In this case, the case 10 is formed of nonflammable resin with electrical insulating properties, in which the independent lines 80 are connected to be electrically stable.

As described above, there is shown the modulated block type power distribution apparatus 90 having four the main breaker terminals 20, the sub breaker terminals 30 and 40 on both sides, and the additional breaker terminals 50, respectively. However, the main breaker terminals 20 may be two or three and the sub breaker terminals 30 and 40 may be two or three on both sides, respectively, which are just changeable according to user environments.

As shown in FIGS. 2 to 4, the main breaker terminals 20 of R, S, T, and N are laminated on R, S, T, and N on a bottom of the main breaker 60 to be connected to one another. The power in the line of R of the main breaker terminal 20, connected to a power source of the main breaker 60, is connected and supplied to R1 of the additional breaker terminal 50, RL of the left sub breaker terminal 30, and RR of the right sub breaker terminal 40 by the line 80, which forms one circuit. The power in the line of S of the main breaker terminal 20 is connected and supplied to S1 of the additional breaker terminal 50, SL of the left sub breaker terminal 30, and SR of the right sub breaker terminal 40 by the line 80, which forms one circuit. The power in the line of T of the main breaker terminal 20 is connected and supplied to T1 of the additional breaker terminal 50, TL of the left sub breaker terminal 30, and TR of the right sub breaker terminal 40 by the line 80, which forms one circuit. The power in the line of N of the main breaker terminal 20 is connected and supplied to N1 of the additional breaker terminal 50, RNL of the left sub breaker terminal 30, and NR of the right sub breaker terminal 40 by the line 80, which forms one circuit.

As shown in FIG. 3, R1, S1, T1, and N1 of the additional breaker terminals 50 sink in a surface of the case 10 to be connected to other external load sides or to be connected to an additional power distribution apparatus, which may be easily assembled after unfastening the bolts 13 to be easily used while adding an additional modulated block type power distribution apparatus according to an embodiment of the present invention. In this case, a sunken part is covered by the additional breaker terminal cover 14 to make an external shape natural.

As shown in FIG. 4, there is shown a top view of a plurality of modulated block type power distribution apparatuses 90 connected and assembled with one main breaker 60, sub breakers 70 and a plurality of the sub breaker terminals, which can be easily used by connecting and fastening to one another using bolts. It is possible to fasten by using pins and other fastening elements in addition to the bolts. The external shape of the modulated block type power distribution apparatus, described above, is just an example. When a block type power distribution apparatus has the same configuration and functions as described above, an external shape thereof may be changed by those skilled in the art. The present invention will not be limited to the described embodiment and the attached drawings.

Figure 5:
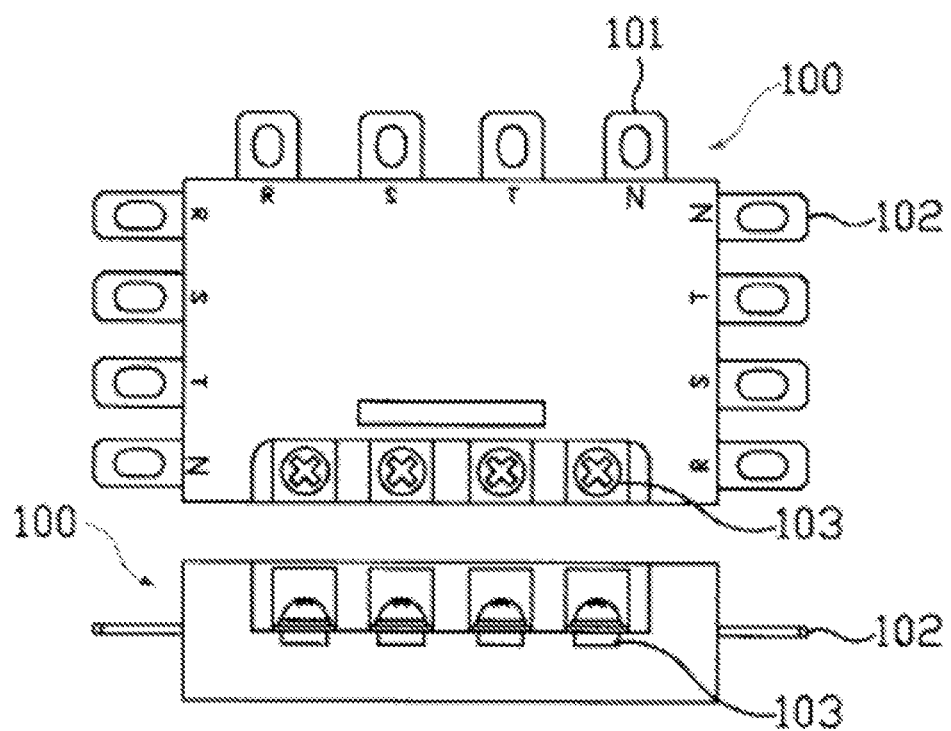
FIG. 5 is a configuration view illustrating a block type power distribution apparatus with four branch breaker terminals.
Figure 6:
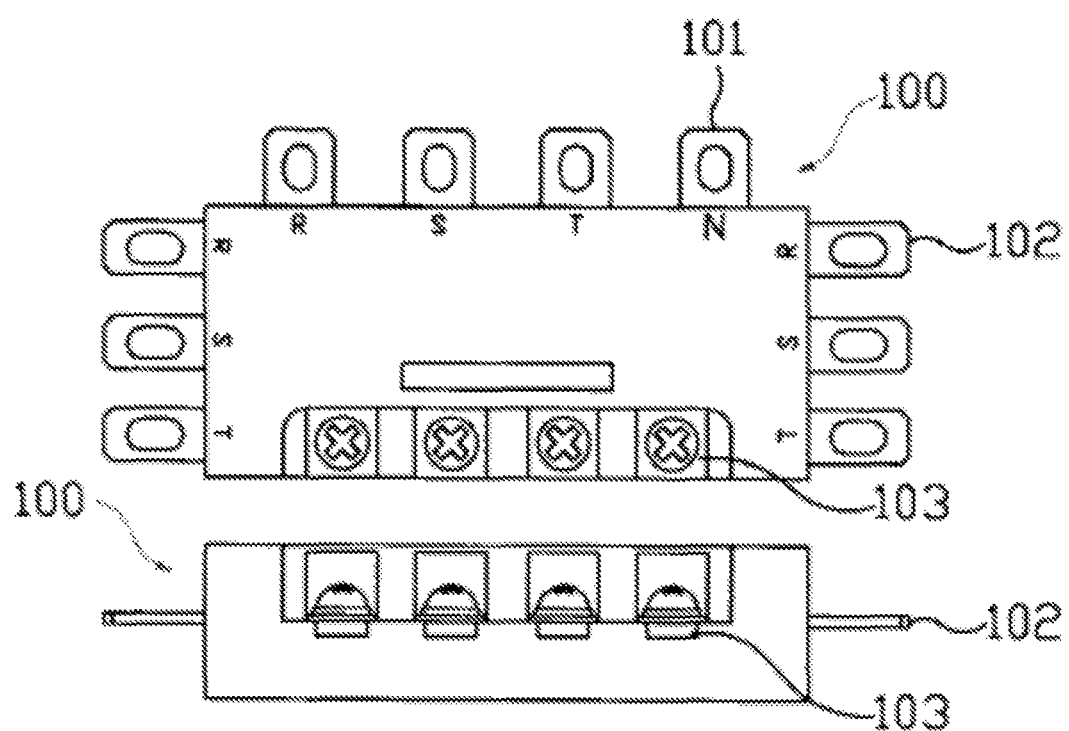
FIG. 6 is a configuration view illustrating a block type power distribution apparatus with three branch breaker terminals.
Figure 7:
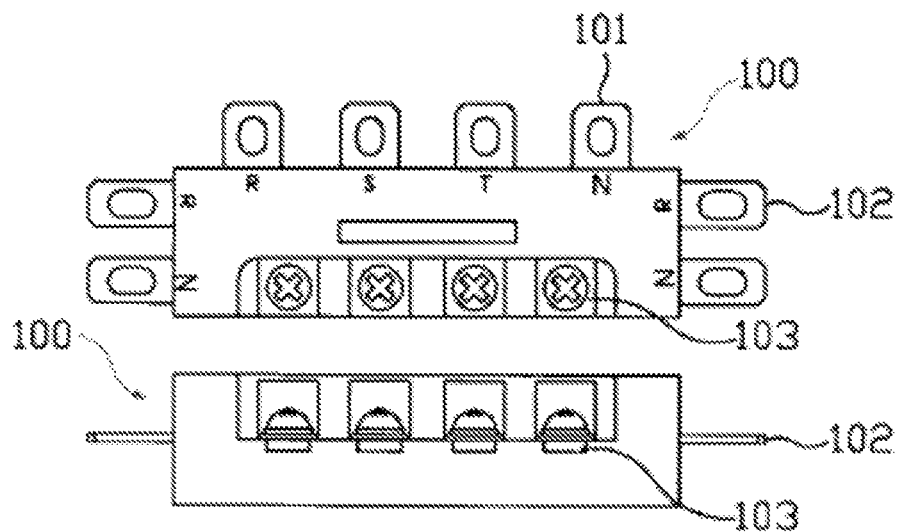
FIG. 7 is a configuration view illustrating a block type power distribution apparatus with two branch breaker terminals.
Figure 8:
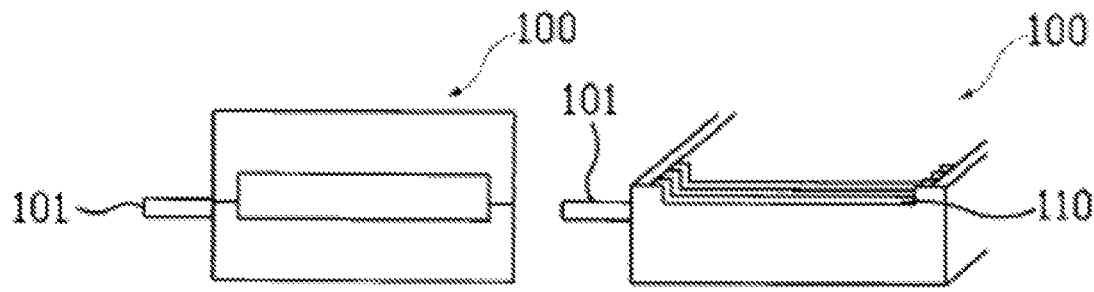
FIG. 8 is a state view illustrating the block type power distribution apparatus with three branch breaker terminals before applying a height controlling supporter thereto.

FIGS. 5, 6, and 7 illustrate a block type power distribution apparatus according to another embodiment of the present invention. The apparatus of FIG. 5 includes four branch breaker terminals, the apparatus of FIG. 6 includes three branch breaker terminals, and the apparatus of FIG. 7 includes two branch breaker terminals.

In detail, there are shown a case 100 for a power distribution apparatus, the case 100 including lines dividing power, a main breaker terminal 101 receiving power from the outside, a branch breaker terminal 102 dividing the power to a branch breaker, and an additional breaker terminal 103 to connect a block type power distribution apparatus. To distribute the power, the main breaker terminal 101 is coupled with a main breaker by a screw and the branch breaker terminal 102 is coupled with a branch breaker by a screw. In the case of a block type power distribution apparatus having such shape, it is possible to connect a desired number of branch breakers to one another by coupling the main breaker terminals 101 by a screw.

FIGS. 8, 9, 10, 11, 12, 13, 14, and 15 illustrate a block type power distribution apparatus with three or two branch breaker terminals, to which height controlling supporters 120a and 120b are applied to control a height of a branch breaker terminal.

That is, a guide groove 110 is formed on a side of the case 100 and the height controlling supporters 120a and 120b are coupled with the guide groove 110.

The height controlling supporters form a coupling groove through which a branch breaker terminal passes. The number of the coupling grooves corresponds to the number of the branch breaker terminals. In FIGS. 8, 9, 10, 11, and 12, since there are three the branch breaker terminals, three of the coupling grooves are formed.

In addition, a main body, where the coupling groove is formed, is slide-coupled with the guide groove to support to strongly coupling the branch breaker terminal with the coupling groove.

Figure 9:
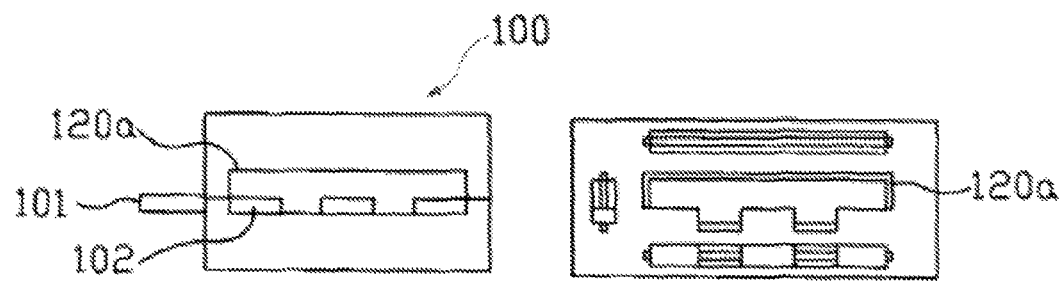
FIG. 9 is a configuration view illustrating a block type power distribution apparatus with three branch breaker terminals after applying a height controlling supporter thereto, according to a first embodiment.
Figure 10:
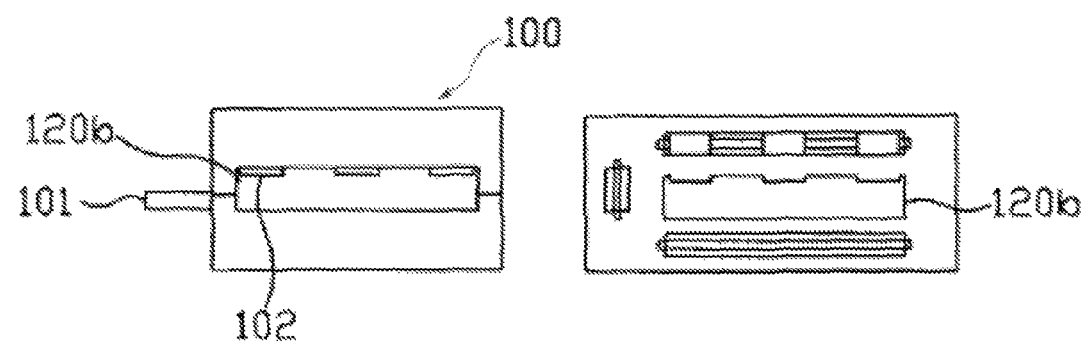
FIG. 10 is a configuration view illustrating a block type power distribution apparatus with three branch breaker terminals after applying a height controlling supporter thereto, according to a second embodiment.
Figure 11:
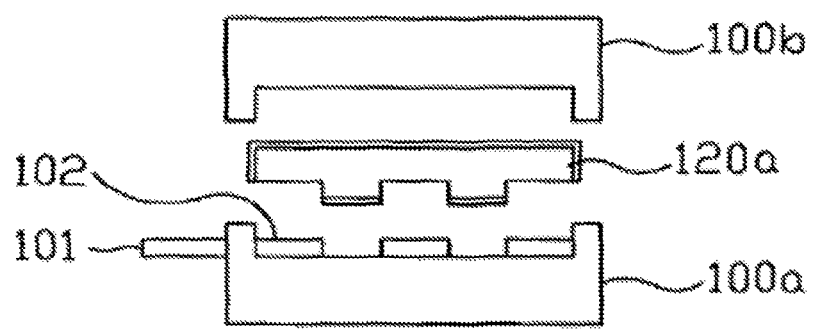
FIG. 11 is a view illustrating the power distribution apparatus of FIG. 9, coupled with a case.
Figure 12:
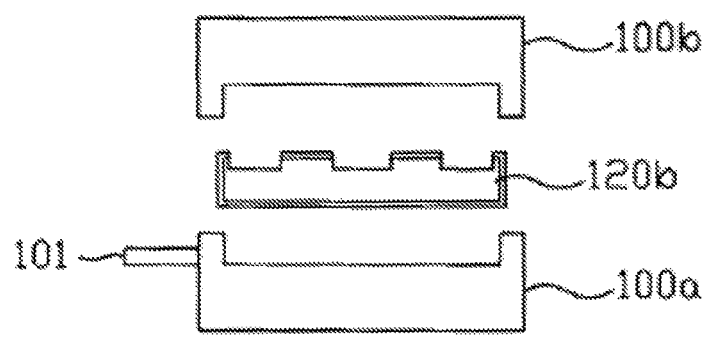
FIG. 12 is a view illustrating the power distribution apparatus of FIG. 10, coupled with a case.

The height controlling supporters may have various shapes according to a height of a branch breaker terminal. In FIG. 9, there is shown a height control supporter 120a formed in the shape of π, in which three coupling grooves are formed on a bottom thereof. In FIG. 10, there is shown a height control supporter 120b formed in the shape of ⊥, in which three coupling grooves are formed on a top thereof. FIG. 11 is an exploded perspective view illustrating the height controlling supporter 120a with the coupling grooves formed below. The height controlling supporter 120a is disposed between a bottom case 100a and a top case 100b, and the bottom case 100a is coupled with the top case 100b to interpose the height controlling supporter 120a therebetween. In FIG. 12, three coupling grooves are located below to dispose the height controlling supporter 120b in the shape of ⊥ and the bottom case 100a is coupled with the top case 100b to interpose the height controlling supporter 120a therebetween. Accordingly, the branch breaker terminal has a height of protrusion, depending on a location of a groove.

Figure 13:
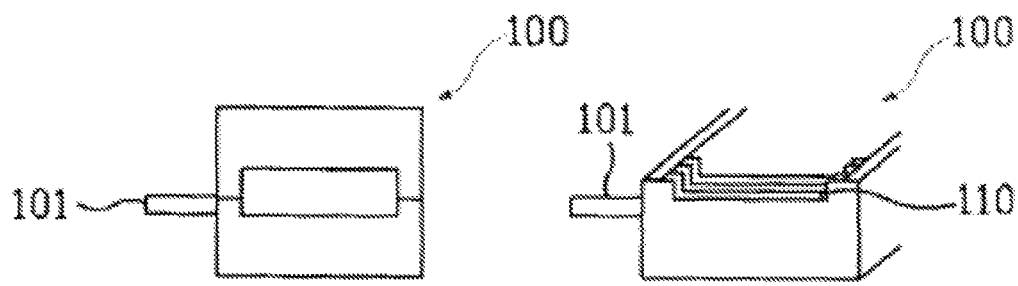
FIG. 13 is a state view illustrating a block type power distribution apparatus with two branch breaker terminals before applying a height controlling supporter thereto.
Figure 14:
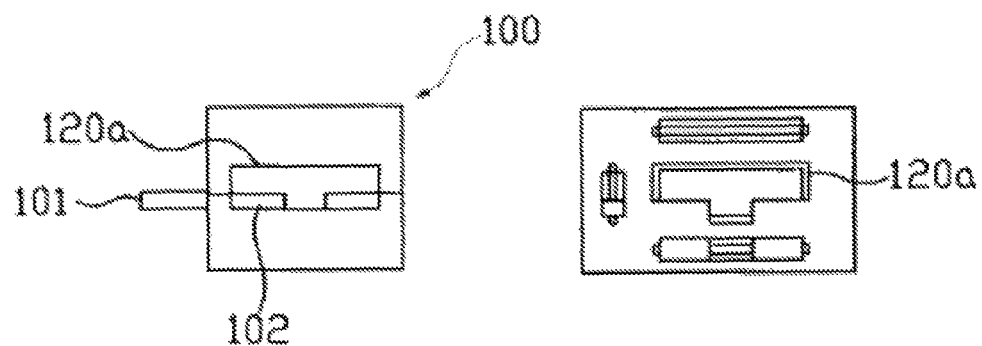
FIG. 14 is a configuration view illustrating a block type power distribution apparatus with two branch breaker terminals after applying a height controlling supporter thereto, according to a first embodiment.
Figure 15:
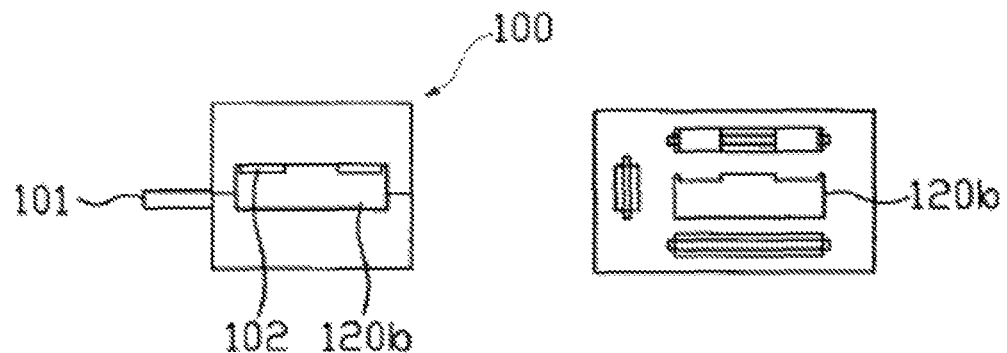
FIG. 15 is a configuration view illustrating a block type power distribution apparatus with two branch breaker terminals after applying a height controlling supporter thereto, according to a second embodiment.

FIGS. 13, 14, and 15 illustrate examples of applying a height controlling supporter capable of controlling a height of a branch breaker terminal in a block type power distribution apparatus with two branch breaker terminals.

Similar to FIGS. 8 to 12, in FIGS. 13, 14, and 15, the guide groove 110 is formed on the side of the case 100 and the height controlling supporters 120a and 120b are coupled with the guide groove 110. The height controlling supporters 120a and 120b from two coupling grooves through which the branch breaker terminal 102 passes. The height controlling supporters 120a and 120b with the coupling grooves are slide-coupled with the guide groove 110 to support to strongly coupling a branch breaker terminal with the coupling grooves.

The height controlling supporter may have various shapes according to a height of a branch breaker terminal. In FIG. 14, there is shown the height controlling supporter 120a formed in the shape of Γ, in which two coupling grooves are located below. In FIG. 15, there is shown the height controlling supporter 120b formed in the shape of ⊥, in which two coupling grooves are located above.

Figure 16:
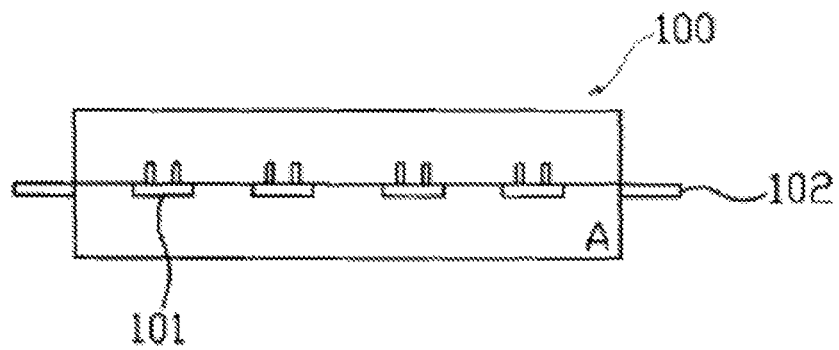
FIG. 16 is a back view illustrating a branch breaker terminal located in the center to illustrate a change in a height of the branch breaker terminal, according to a first embodiment.
Figure 17:
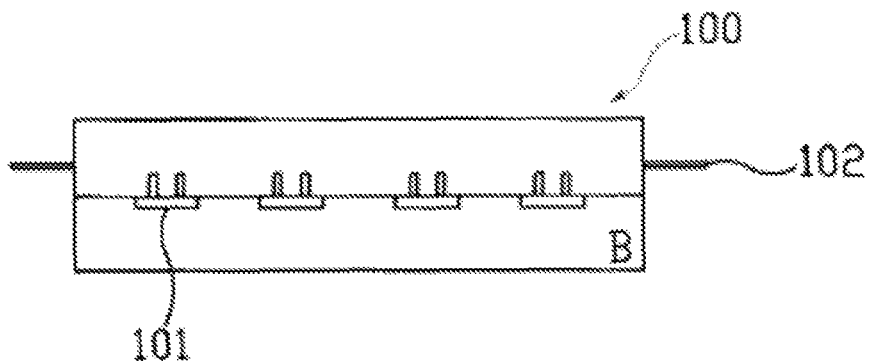
FIG. 17 is a back view illustrating a branch breaker terminal located in the center to illustrate a change in a height of the branch breaker terminal, according to a second embodiment.

FIG. 16 is a back view illustrating a branch breaker terminal formed in the center of the case 100. FIG. 17 is a back view illustrating a branch breaker terminal formed on a top of the case 100. As shown in FIGS. 16 and 17, the branch breaker terminal of FIG. 17 is located upper than that of FIG. 16, which is manufactured corresponding to a height of another breaker.

Figure 18:
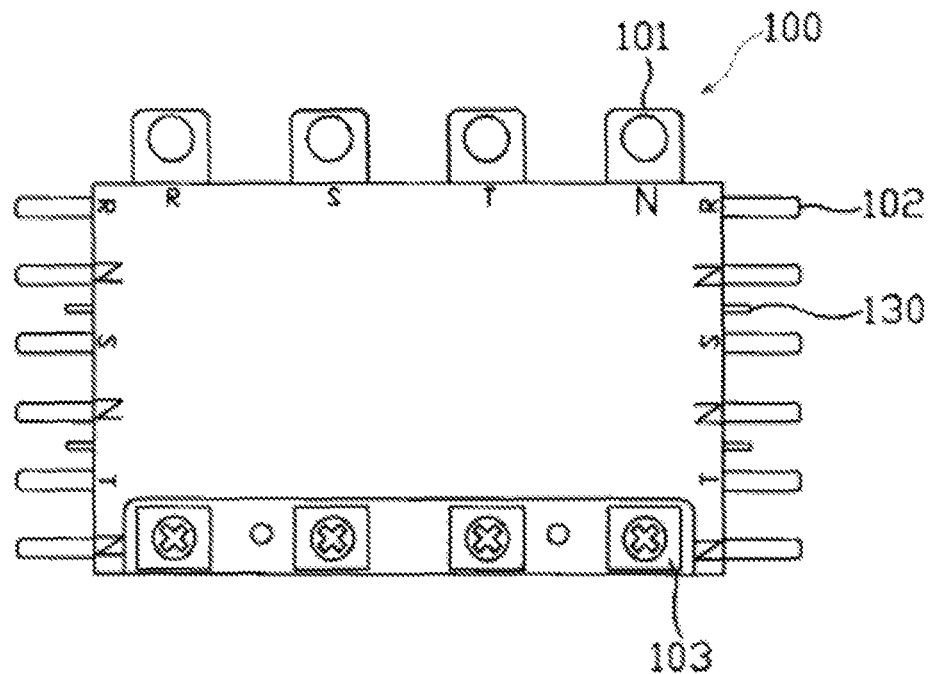
FIG. 18 is a configuration view illustrating a block type power distribution apparatus with safety pins to distinguish three pairs of branch breaker terminals.
Figure 19:
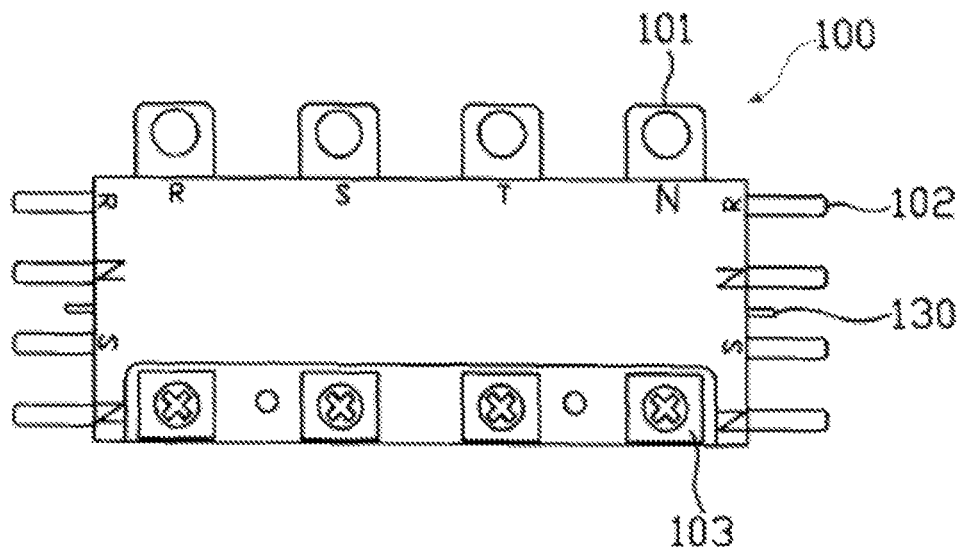
FIG. 19 is a configuration view illustrating a block type power distribution apparatus with safety pins to distinguish two pairs of branch breaker terminals.

FIG. 18 is an external view illustrating a block type power distribution apparatus with safety pins 130 for dividing three pairs of breakers, the apparatus having a configuration capable of basically preventing a wrong connection of branch breaker terminals when to connect the three pairs of branch breaker terminals by projecting the safety pins 130 to distinguish a breaker from another breaker on a height controlling supporter.

Figure 20:
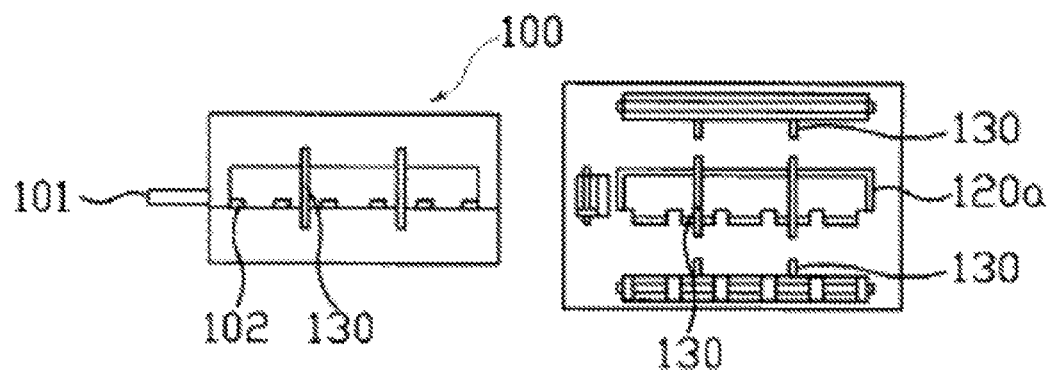
FIG. 20 is a view illustrating safety pins for distinguishing three pairs of branch breaker terminals and a height controlling supporter capable of controlling a height.

FIG. 20 is a view illustrating an example of installing the safety pins 130 on the height controlling supporter 120a, in which two of the safety pins 130 are formed on the height controlling supporter 120a to control a height of the block type power distribution apparatus divided into three pairs.

Accordingly, a height of six branch breaker terminals is controlled simultaneously with dividing the branch breaker terminals into three pairs by two by the safety pins 130. A branch breaker terminal of another block type power distribution apparatus may be safely coupled with the divided branch breaker terminals 102.

Figure 21:
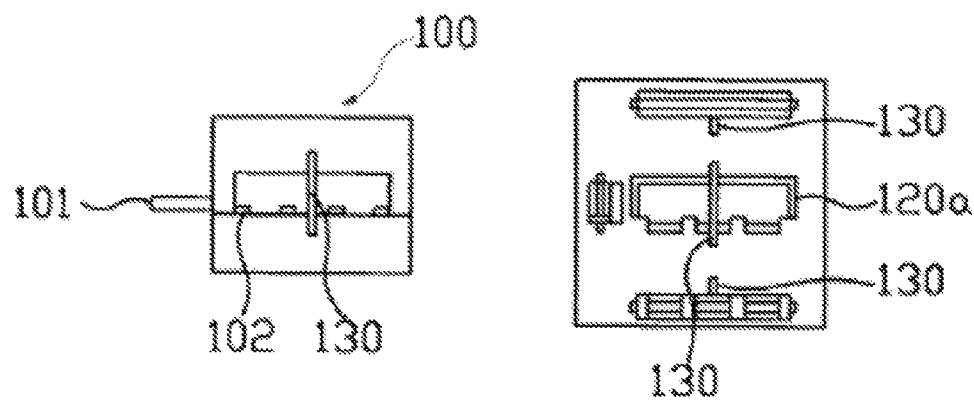
FIG. 21 is a view illustrating safety pins for distinguishing two pairs of branch breaker terminals and a height controlling supporter capable of controlling a height.

FIG. 21 is a view illustrating another example of installing safety pins 130 on the height controlling supporter 120a, in which one safety pin 130 is formed on the height controlling supporter 120a to control a height of the block type power distribution apparatus divided into two pairs.

Accordingly, a height of four branch breaker terminals is controlled simultaneously with dividing the branch breaker terminals into two pairs by two by the safety pin 130. A branch breaker terminal of another block type power distribution apparatus may be safely coupled with the divided branch breaker terminals 102.

Figure 22:
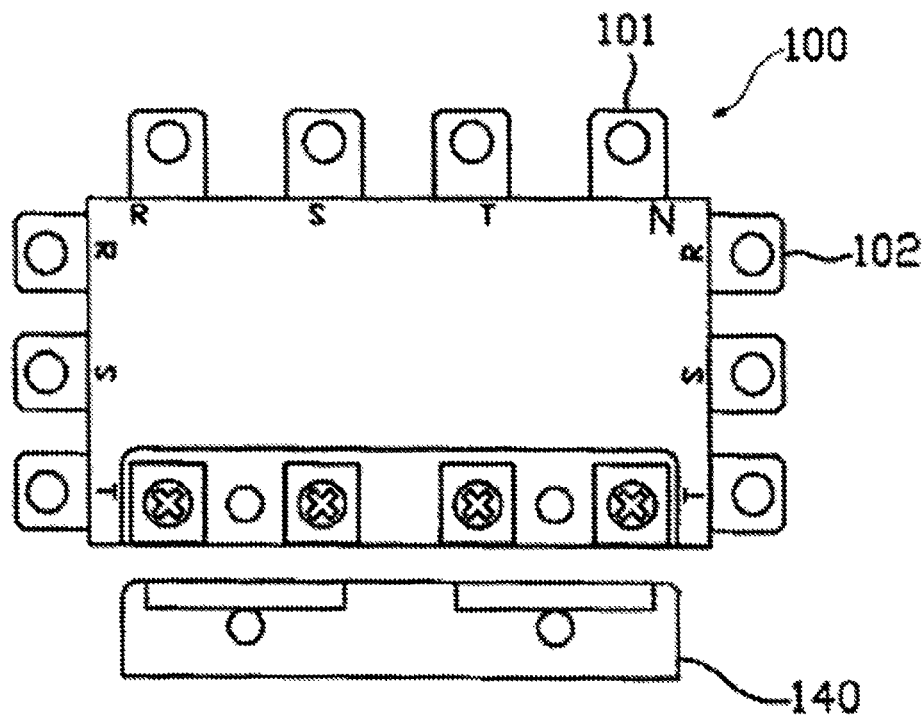
FIG. 22 is a configuration view illustrating a power distribution apparatus and a cover for an additional breaker terminal.
Figure 23:
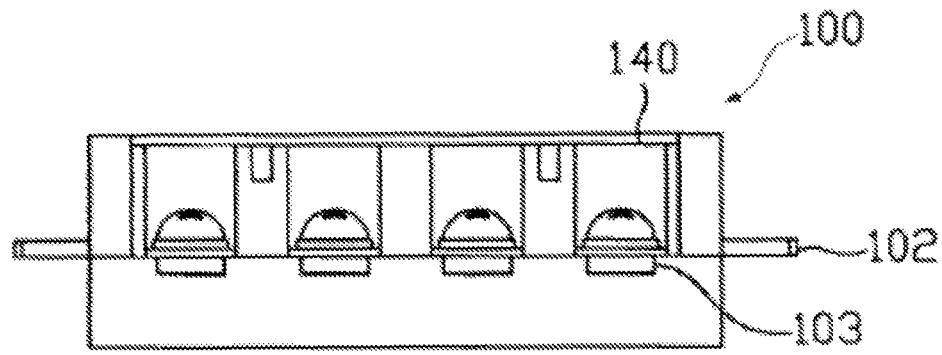
FIG. 23 is a front view illustrating the cover applied to the additional breaker terminal.

FIGS. 22 and 23 are a configuration view and a front view illustrating a cover for a connection terminal and an open block type power distribution apparatus, in which a main breaker terminal 101 of an additional block type power distribution apparatus is connected to an additional breaker terminal of the block type power distribution apparatus by a bolt and is covered by a transparent cover 140 to check a state of overheating or unfastening of the bolt.

In this case, on the transparent cover 140, there is formed a name tag capable of recording the name of a branched terminal thereon. To fasten the transparent cover 140 to the case 100, there are used a fastening pin and a fastening groove.

Figure 24:
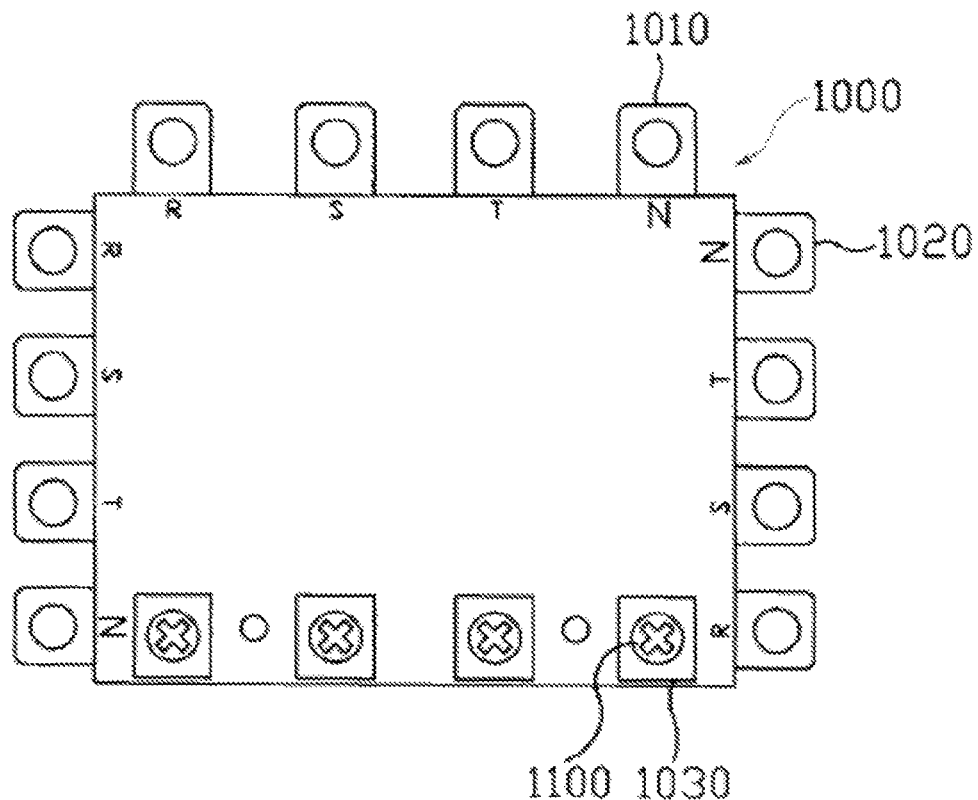
FIG. 24 is a configuration view illustrating a power distribution apparatus according to another embodiment of the present invention.
Figure 25:
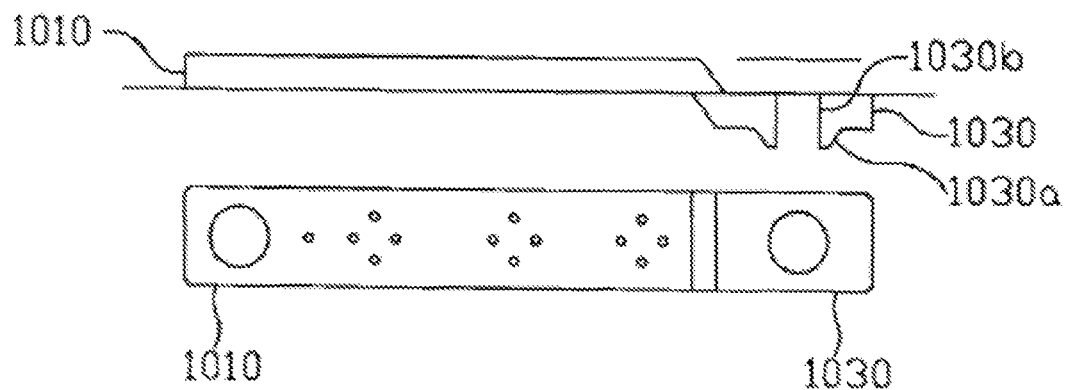
FIG. 25 is a configuration view illustrating a connection terminal coupled by burying.
Figure 26:
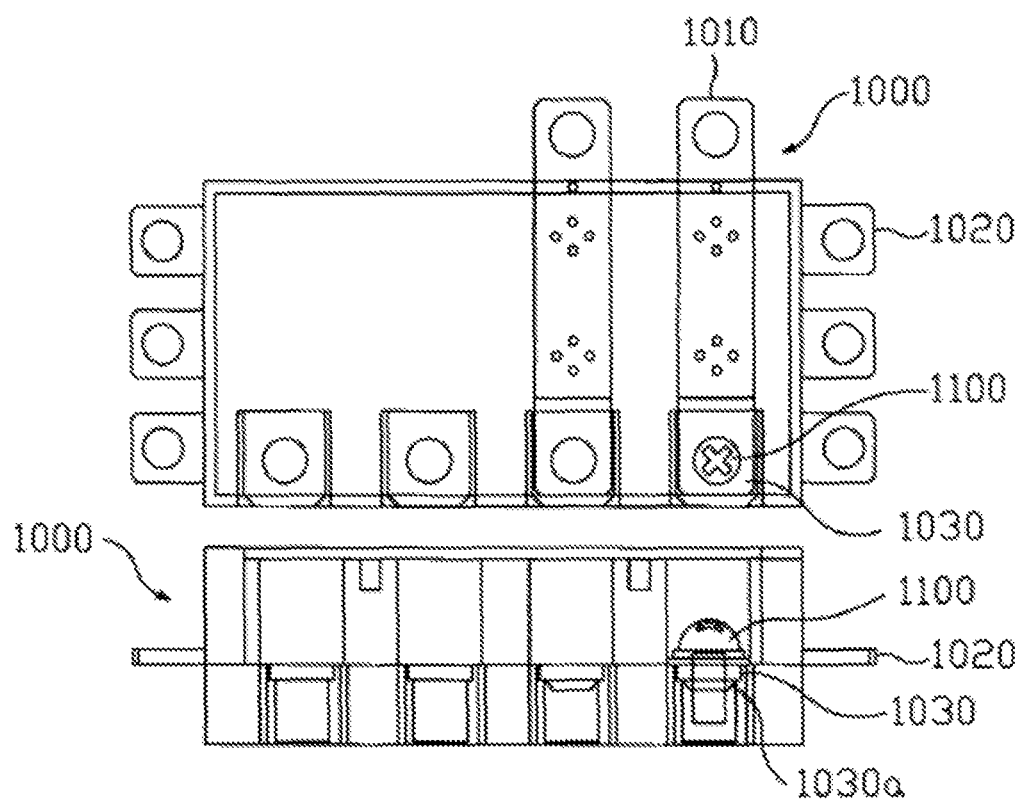
FIG. 26 is a view illustrating the top and front of a power distribution apparatus assembled by burying a connection terminal.
Figure 27:
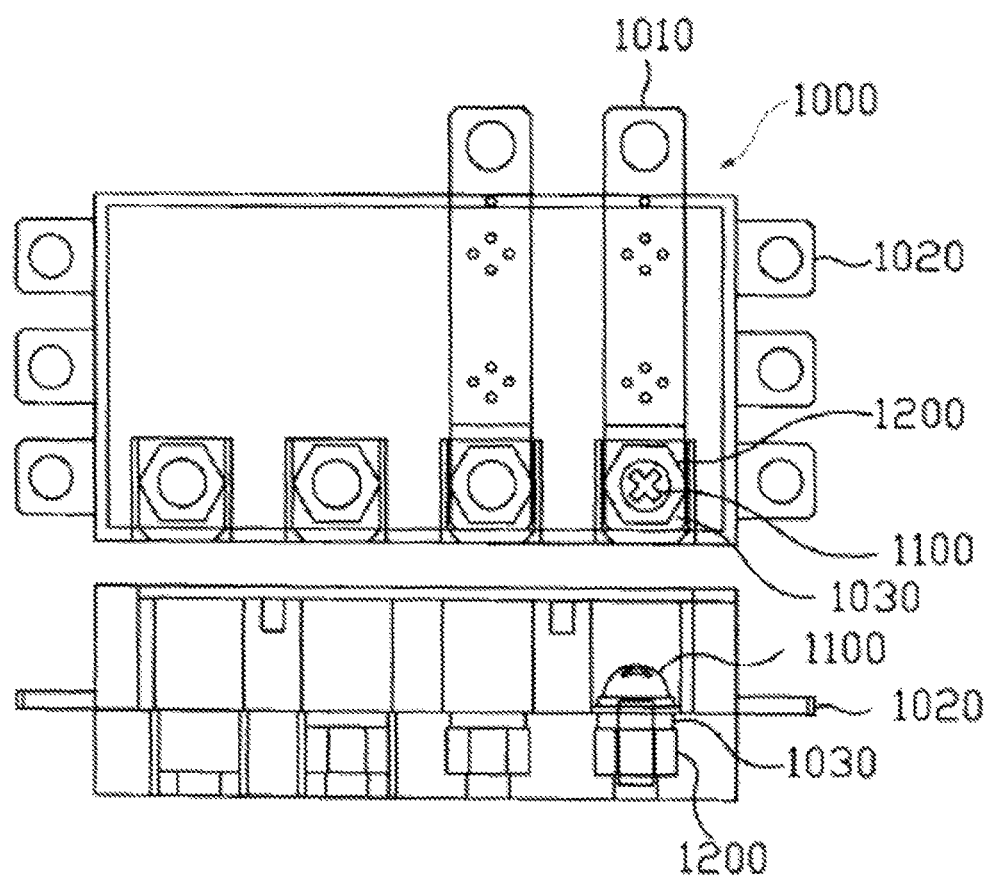
FIG. 27 is a view illustrating the top and front of a coupling nut inserted into a power distribution apparatus.
Figure 28:
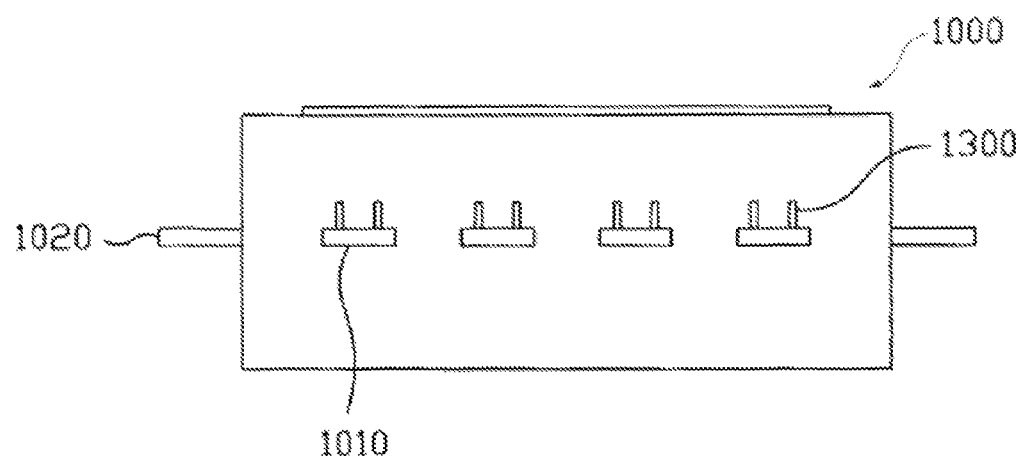
FIG. 28 is a configuration view illustrating a ventilating opening formed on a power distribution apparatus.
Figure 29:
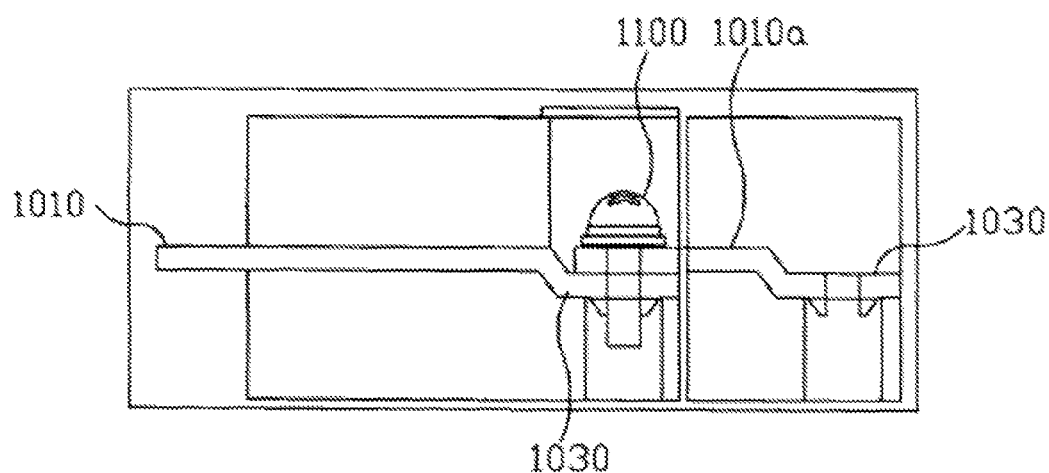
FIG. 29 is a configuration view illustrating an additional breaker terminal of a power distribution apparatus, formed in the shape of a step.

FIG. 24 is a configuration view illustrating a power distribution apparatus according to another embodiment of the present invention. FIG. 25 is a configuration view illustrating a connection terminal coupled by burying. FIG. 26 is a view illustrating the top and front of the power distribution apparatus assembled by burying the connection terminal. FIG. 27 is a view illustrating the top and front of a coupling nut inserted into the power distribution apparatus. FIG. 28 is a configuration view illustrating a ventilating opening formed on the power distribution apparatus. FIG. 29 is a configuration view illustrating an additional breaker terminal of the power distribution apparatus, the additional breaker terminal formed in the shape of a step. FIGS. 24, 25, and 26 are configuration views illustrating a protrusion buried in a preassembled power distribution apparatus according to an embodiment of the present invention, which will be described in detail hereinafter.

The preassembled power distribution apparatus includes a case 1000, a plurality of main breaker terminals 1010, a plurality of branch breaker terminals 1020, and a plurality of additional breaker terminals 1030 having a buried protrusion 1030a.

The case 1000 protects the main breaker terminal 1010, the branch breaker terminal 1020, and the additional breaker terminals 1030, forming the preassembled power distribution apparatus, and power distribution lines connected thereto.

The main breaker terminal 1010 is located on a top of the case 1000, is connected to a main breaker by the line, and branches off main power.

The branch breaker terminal 1020 is located on one or both sides of the case 1000, is connected to the main breaker terminal 1010, and branches power supplied to the main breaker terminal 1010.

The additional breaker terminal 1030 is located on a bottom of the case 1000 and sinks in a surface of the case 1000 to be connected to another external load side or connected to an additionally added distribution line.

In addition, a bottom of the additional breaker terminal 1030 is formed in one single body with the protrusion 1030*a* formed by burying, in which a screw thread is formed. Most important feature of the present invention is the protrusion 1030*a* formed by burying in the bottom of the additional breaker terminal 1030 in a single body.

The buried protrusion 1030*a* is formed by thrusting a structure below to be protruded while punching to form a bolt coupling hole on the additional breaker terminal 1030 and forming a screw thread 1030*b* on the bolt coupling hole and the protruded portion.

When forming the buried protrusion 1030*a* as described above, since a contact area on a bolt 1100 is increased while coupling with the bolt 1100, coupling strength is increased while coupling another main breaker terminal 1010 with the additional breaker terminal 1030, thereby previously preventing a separation of the main breaker terminal 1010 and the additional breaker terminal 1030 while applying an external shock.

Accordingly, the screw thread 1030*b* thicker than a thickness of a terminal is formed on the additional breaker terminal 1030 of the power distribution apparatus to increase the contact area on the bolt 1100 while connecting the power distribution apparatus to another power distribution apparatus by using the bolt 1100, thereby preventing a separation between terminals simultaneously with reducing electric resistances.

FIG. 27 illustrates a configuration of installing a coupling nut in the case 1000, the coupling nut solving a problem of conventional screws, the problem in which an unfastening phenomenon occurring on a connection part, caused by a deformation of a material due to heat while connecting a main breaker terminal with an additional breaker terminal when using a terminal formed of a material with low heat resisting properties, such as aluminum or economic light copper.

That is, in FIG. 27, in the case of the preassembled power distribution apparatus including the case 1000, the main breaker terminal 1010, the branch breaker terminal 1020, and the additional breaker terminal 1030, a coupling nut 1200 is additionally installed in the case where the additional breaker terminal 1030 is installed to couple the additional breaker terminal 1030 with a main breaker terminal 1010 of another preassembled power distribution apparatus by doubly coupling the bolt 1100 in such a way that the main breaker terminal 1010 is strongly coupled with the additional breaker terminal 1030 to prevent a bolt unfastening phenomenon on a connection part.

FIG. 28 illustrates a ventilating opening 1300 vertically formed on the top of the case 1000 according to an embodiment of the present invention. External air flows into the case 1000 via the ventilating opening 1300, thereby cooling heat generated by electric coupling in the case 1000.

Accordingly, the overheating of the case 1000 may be prevented, thereby allowing an electric flow to be smooth and preventing a damage of the case 1000, caused by the overheating. The ventilating opening 1300 may be installed on a branch breaker terminal in addition to a main breaker terminal.

FIG. 29 illustrates an additional breaker terminal 1030 manufactured to form a step. The additional breaker terminal 1030 is formed to be bent lower than the main breaker terminal 1010. A main breaker terminal 1010*a* of another preassembled power distribution apparatus is closely attached to a top of the additional breaker terminal 1030 to be assembled therewith.

In this case, a height of the main breaker terminal 1010 of the preassembled power distribution apparatus is identical to that of the main breaker terminal 1010*a* of the other preassembled power distribution apparatus, thereby maintaining a certain height of all of the preassembled power distribution apparatuses though consecutively installing a plurality of preassembled power distribution apparatuses.

Accordingly, since a certain height is maintained when installing the preassembled power distribution apparatus to a main body, installation is easy and arrangement is fine.

Therefore, the preassembled power distribution apparatus may previously prevent unfastening occurring in a connection between terminals and heat generation caused by the increase of resistances, to be more safely used. Also, manufacturing costs may be reduced by using less amount of a material or a more economic material.

While the present invention has been particularly shown and described with reference to exemplary embodiments thereof, it will be understood by those of ordinary skill in the art that various changes in form and details may be made therein without departing from the spirit and scope of the present invention as defined by the following claims

INDUSTRIAL APPLICABILITY

The present invention may be applied to the field of manufacturing power distribution apparatuses.

The invention claimed is:

1. A modulated block type power distribution apparatus comprising:
    a main breaker terminal electrically connected to a main breaker;
    sub breaker terminals arranged right and left of the main breaking terminal and electrically connected to a sub breaker; and
    an additional breaker terminal arranged below the main breaker terminal and connected to an additional breaker, the apparatus having a connecting configuration, wherein the main breaker terminal is arranged in an order of (R), (S), (T) and (N) from left to right,
    the additional breaker terminal is arranged in an order of (R1), (S1), (T1) and (N1) from left to right,
    the left sub breaker terminal is arranged in an order of (RL), (SL), (TL) and (NL) from top to bottom,
    the right sub breaker terminal is arranged in an order of (NR), (SR), (TR) and (NR) from top to bottom,
    the main breaker terminal in the line of (R) is connected to the additional breaker terminal (R1), the left sub breaker terminal (RL), and the right sub breaker terminal (RR);
    the main breaker terminal in the line of (S) is connected to the additional breaker terminal (S1), the left sub breaker terminal (SL), and the right sub breaker terminal (SR);
    the main breaker terminal in the line of (T) is connected to the additional breaker terminal (T1), the left sub breaker terminal (TL), and the right sub breaker terminal (TR); and
    the main breaker terminal in the line of (N) is connected to the additional breaker terminal (N1), the left sub breaker terminal (NL), and the right sub breaker terminal (NR).

2. The apparatus of claim 1, wherein power is supplied via a modulated block without a bus connecting the main breaker and the sub breaker.

3. The apparatus of claim 1, wherein the sub breaker is connected to only one of both sides of the apparatus.

4. The apparatus of claim 1, wherein the main breaker terminals (R), (S), (T) and (N) are connected to the left sub breaker terminal by using a plurality of rivets, and
the main breaker terminals (R), (S), (T) and (N) are connected to the right sub breaker terminal by using a plurality of rivets.

5. The apparatus of claim 1, wherein the left sub breaker terminal (NL) and the right sub breaker terminal (RR) are disposed in a straight line.

6. The apparatus of claim 1, wherein a top case and a bottom case, surrounding the apparatus, are fastened using a protruded pin for preventing shake, when coupling the top case and bottom case with each other.

7. The apparatus of claim 6, wherein the additional breaker terminal is formed to be disposed inside without protruding outwardly from the top case and the bottom case and is arranged between the left sub breaker terminal (NL) and the right sub breaker terminal (RR).

8. A multifunctional block type power distribution apparatus comprising:
a case protecting a power distribution line connecting to a main breaker terminal, a branch breaker terminal, and an additional breaker terminal;
a plurality of the main breaker terminals located on a top surface of the case and connected to a main breaker power by a line;
a plurality of the branch breaker terminals located on both sides of the case and connected to a branch breaker power by a line; and
a plurality of the additional breaker terminals located on a bottom surface and sinking in a surface of the case to be connected to an external load side or to be connected to an additional distribution line,
wherein the case comprises a guide groove formed on the side thereof to control a height according to that of another branch breaker, and
height controlling supporters inserted in the guide groove and forming a coupling groove for the branch breaker terminal, the coupling groove corresponding to a height of a terminal.

9. The apparatus of claim 8, wherein the height controlling supporters have a shape of "$\pi$", "$\text{⊥}$", "$\top$" or "$\bot$".

10. A multifunctional block type power distribution apparatus comprising:
a case protecting a power distribution line connecting to a main breaker terminal, a branch breaker terminal, and an additional breaker terminal;
a plurality of the main breaker terminals located on a top surface of the case and connected to a main breaker power by a line;
a plurality of the branch breaker terminals located on both sides of the case and connected to a branch breaker power by a line;
a plurality of the additional breaker terminals located on a bottom surface and sinking in a surface of the case to be connected to an external load side or to be connected to an additional distribution line; and
a safety pin located on the side of the case to divide connection of a branch breaker.

* * * * *